Figure 1:
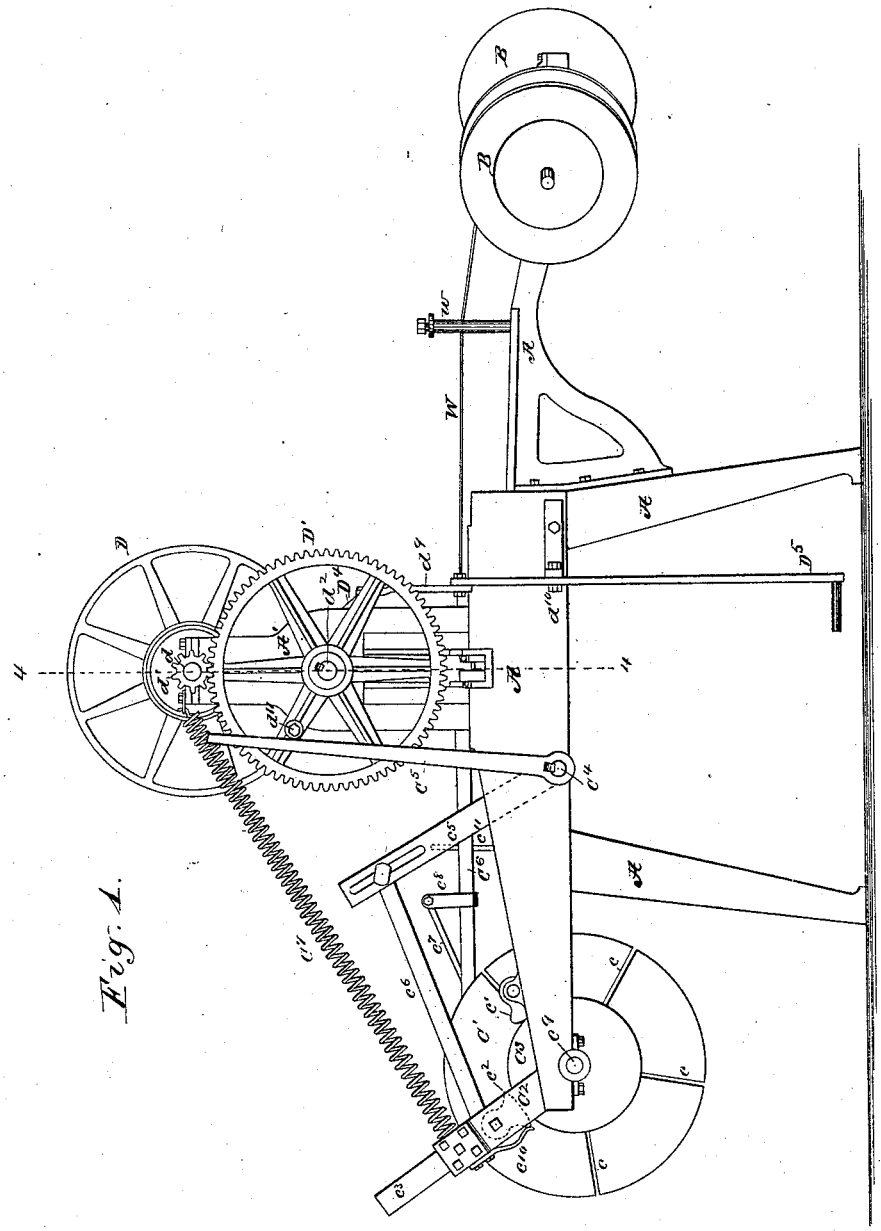

(No Model.)　　　　　　　　　　　　　　　　　　10 Sheets—Sheet 1.
O. P. BRIGGS.
MACHINE FOR APPLYING METAL PIECES TO A WIRE OR TO WIRES.

No. 301,955.　　　　　　　　　　Patented July 15, 1884.

WITNESSES
F. W. Adams
C. Clarence Poole

INVENTOR
Orlando P. Briggs
per M. L. Dayton
Attorney (No Model.) 10 Sheets—Sheet 3.

O. P. BRIGGS.
MACHINE FOR APPLYING METAL PIECES TO A WIRE OR TO WIRES.

No. 301,955. Patented July 15, 1884.

WITNESSES
F. U. Adams
C. Clarence Poole

INVENTOR
Orlando P. Briggs
per M. E. Dayton
Attorney

N. PETERS, Photo-Lithographer, Washington, D. C.

(No Model.)
10 Sheets—Sheet 4.
O. P. BRIGGS.
MACHINE FOR APPLYING METAL PIECES TO A WIRE OR TO WIRES.
No. 301,955. Patented July 15, 1884.
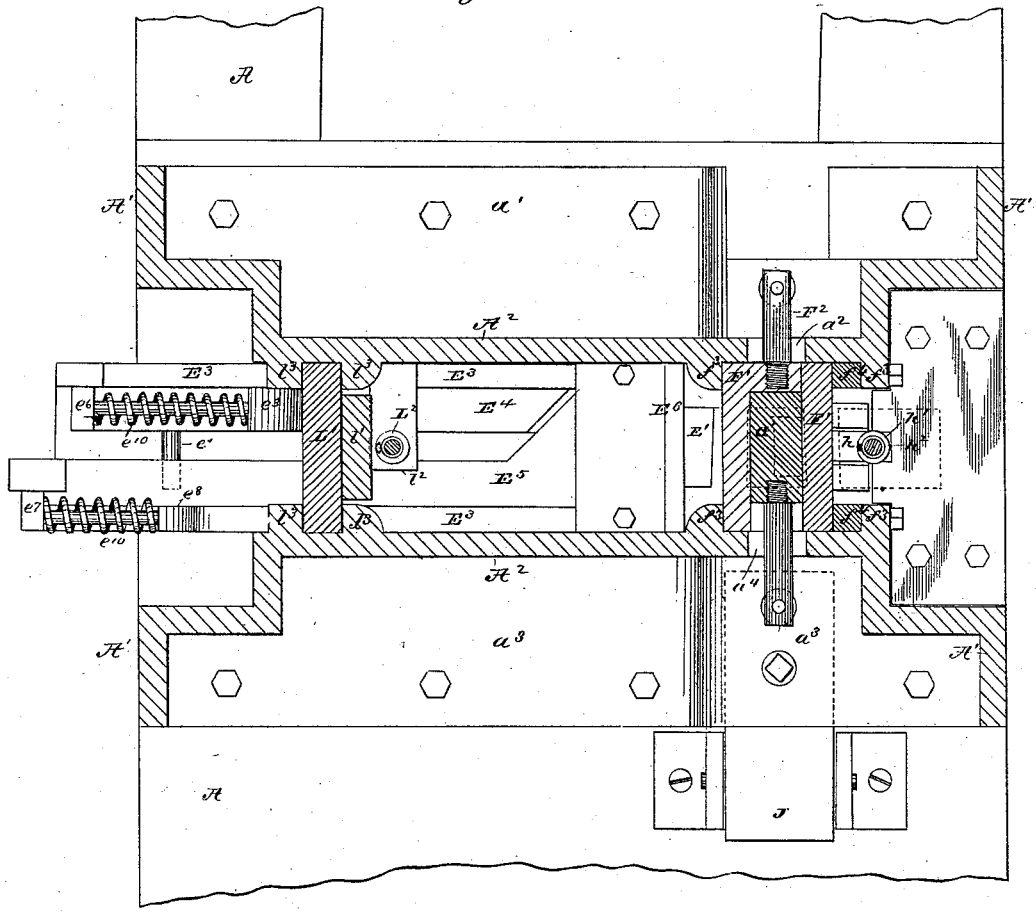
WITNESSES
F. U. Adams
C Clarence Poole
INVENTOR
Orlando P. Briggs
Jno. W. S. Dayton
Attorney (No Model.) 10 Sheets—Sheet 5.

O. P. BRIGGS.
MACHINE FOR APPLYING METAL PIECES TO A WIRE OR TO WIRES.

No. 301,955. Patented July 15, 1884.

WITNESSES
D. U. Adams
C. Clarence Poole

INVENTOR
Orlando P. Briggs
per W. E. Dayton
Attorney (No Model.) 10 Sheets—Sheet 6.

O. P. BRIGGS.
MACHINE FOR APPLYING METAL PIECES TO A WIRE OR TO WIRES.

No. 301,955. Patented July 15, 1884.

WITNESSES
J. U. Adams
C Clarence Poole

INVENTOR
Orlando P. Briggs
per W. E. Taylor
Attorney (No Model.) 10 Sheets—Sheet 7.
O. P. BRIGGS.
MACHINE FOR APPLYING METAL PIECES TO A WIRE OR TO WIRES.
No. 301,955. Patented July 15, 1884.
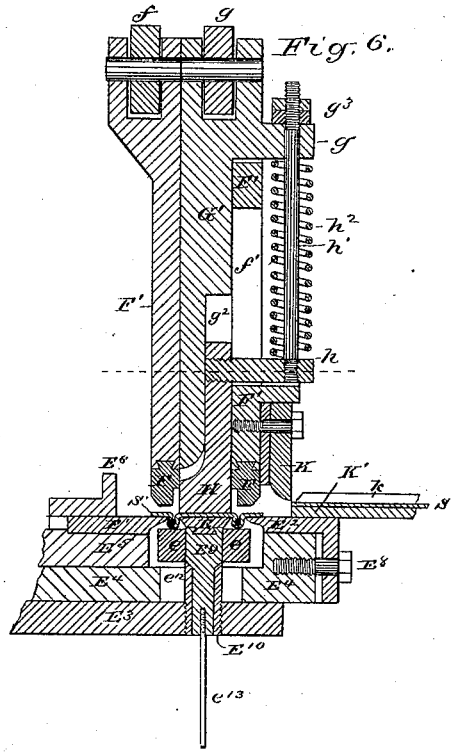
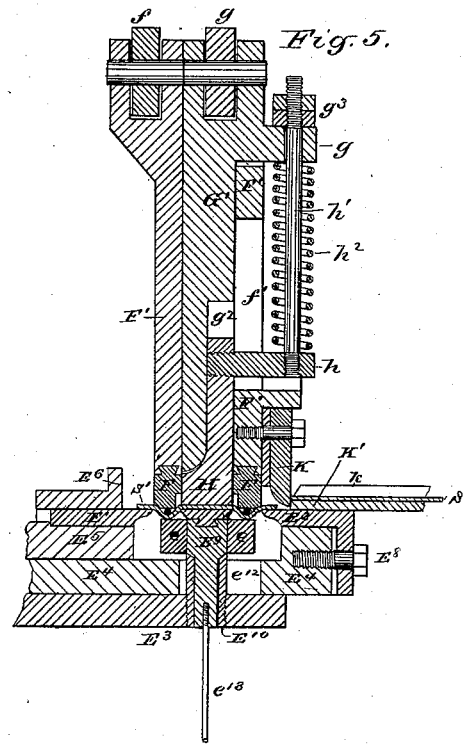
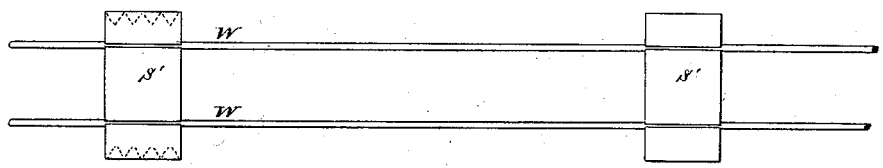
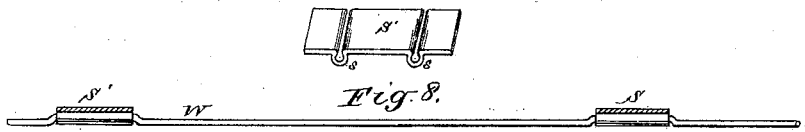
WITNESSES
F. U. Adams
C. Clarence Poole
INVENTOR
Orlando P. Briggs
per M. E. Dayton
Attorney

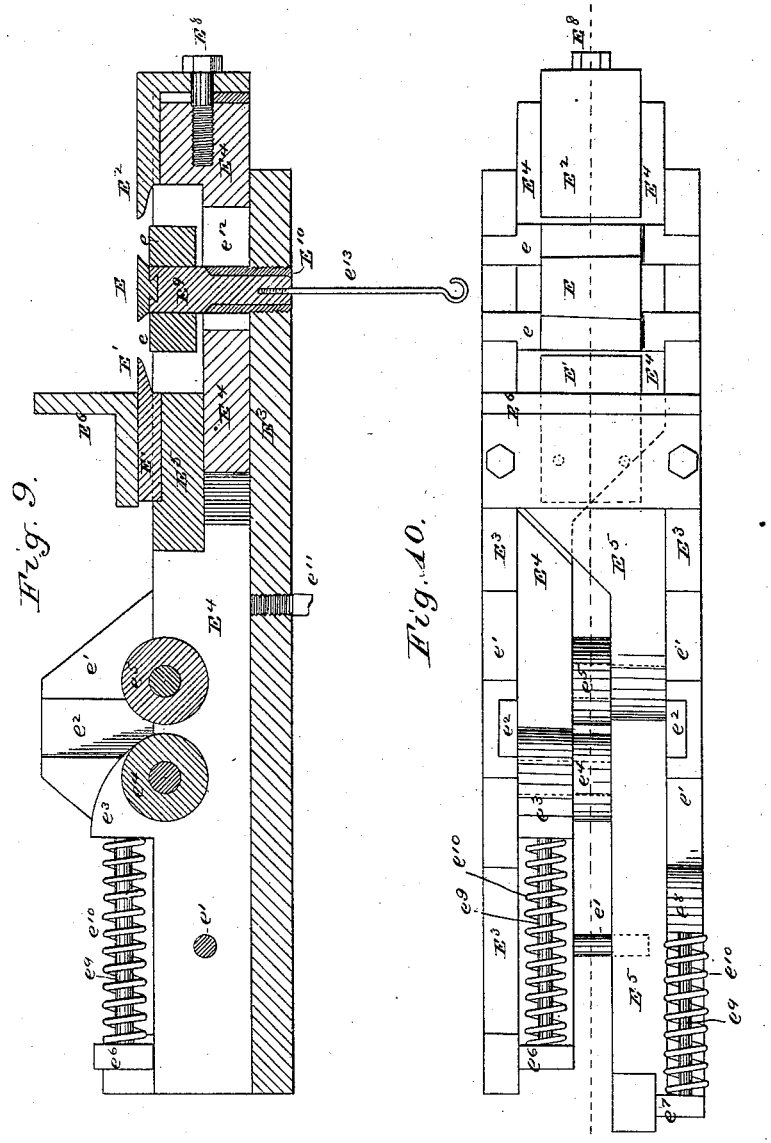

(No Model.) 10 Sheets—Sheet 9.

O. P. BRIGGS.
MACHINE FOR APPLYING METAL PIECES TO A WIRE OR TO WIRES.

No. 301,955. Patented July 15, 1884.

WITNESSES
F. W. Adams
C. Clarence Poole

INVENTOR
Orlando P. Briggs
per W. E. Dayton
Attorney (No Model.) 10 Sheets—Sheet 10.
O. P. BRIGGS.
MACHINE FOR APPLYING METAL PIECES TO A WIRE OR TO WIRES.
No. 301,955. Patented July 15, 1884.
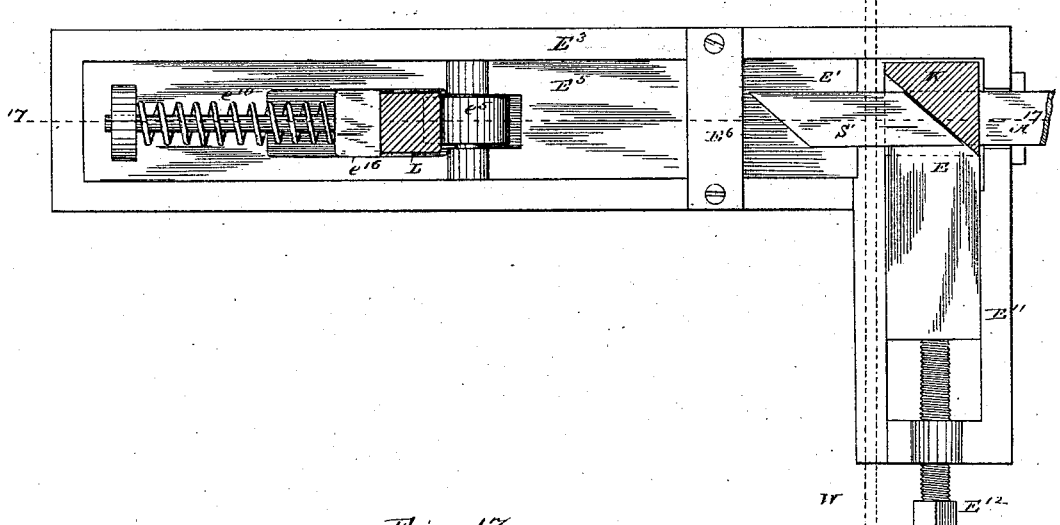
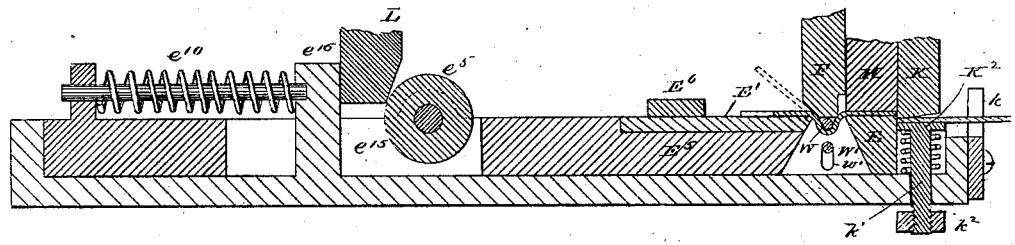
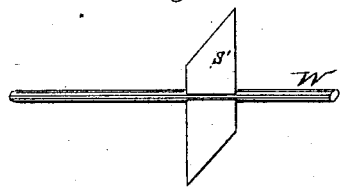
WITNESSES
F. W. Adams
C. Clarence Poole
INVENTOR
Orlando P. Briggs
per M. E. Dayton
Attorney

UNITED STATES PATENT OFFICE.

ORLANDO P. BRIGGS, OF CHICAGO, ILLINOIS, ASSIGNOR TO THE THORN WIRE HEDGE COMPANY, OF SAME PLACE.

MACHINE FOR APPLYING METAL PIECES TO A WIRE OR TO WIRES.

SPECIFICATION forming part of Letters Patent No. 301,955, dated July 15, 1884.

Application filed September 25, 1882. (No model.)

*To all whom it may concern:*

Be it known that I, ORLANDO P. BRIGGS, of Chicago, in the county of Cook and State of Illinois, have invented certain new and useful Improvements in Machines for Applying Metal Pieces to a Wire or Wires; and I do hereby declare that the following is a full, clear, and exact description thereof, reference being had to the accompanying drawings, and to the letters of reference marked thereon, which form a part of this specification.

In Letters Patent No. 252,071, granted to me January 10, 1882, I have shown a structure consisting of pieces of sheet metal fastened at intervals of a few inches upon two parallel and separated wires by folding the sheet-metal pieces between their ends about the several wires, the ends of the sheet-metal pieces standing or projecting in their original direction and in the same plane with each other after being thus secured to the wires. Said structure is intended to be applied as a top rail to barbed-wire fences, and to serve as a warning to stock by reason of the sheet-metal pieces being visible at a considerable distance.

An object of this present invention is to provide means for fastening a piece of sheet metal upon a wire by making in the sheet metal the kind of fold above referred to about the wire.

It is also an object of the invention to simultaneously so fold a piece of sheet metal about two parallel and separated wires.

It is another object of said invention to provide devices necessary to an automatic and consecutive action of the parts concerned in the operation of applying the sheet metal to a wire or wires, so as to constitute a useful and practical machine for the purpose adapted to be run by power.

Other minor objects had in view will be mentioned in connection with the following description of the machine and its operation.

My invention is herein mainly illustrated in that form or application thereof by which it is adapted to simultaneously attach the sheet-metal pieces to two parallel and separated wires for the manufacture of the warning-wire rail described and claimed in my before-mentioned Letters Patent.

The machine so constructed is, however, adapted to apply the strips to a single wire only, and in certain figures of the drawings I have shown details or parts of a machine operating in accordance with my invention, and adapted to make the fold of the sheet-metal pieces upon a single wire, and to cut the said sheet-metal pieces in such oblique direction as to give them points at their ends. In other words, I have shown the invention as adapted to make metal barbs, and to attach them to a wire by the particular form of fold above referred to.

The essential features in the operation of my invention consists in first depressing the fence-wire into a transverse groove in the sheet-metal piece, which groove may have been previously formed in the said piece, or may be formed in the act of depressing the wire; and, second, in forcing the walls of the depression inwardly toward each other and about the wire, so as to at least more than half embrace the latter as a means of permanently connecting said sheet-metal pieces to the wire.

As herein illustrated, the sheet metal is supplied to the machine in the form of a strip. This strip is intermittently fed forward transversely to the also intermittently-advancing wire, to which it is to be secured, and after coming to rest is severed by a suitable knife, leaving the detached part thereof beneath the wire. A plunger then descends upon the wire and forces the same and the underlying part of the sheet-metal piece into a subjacent groove formed of two parts, of which one is movable, after which the walls of the groove are made to approach each other, and to thereby force the sheet metal inward about the wire, as and for the purpose above stated. While the sheet-metal piece is being thus compressed or folded upon the wire, the ends of said piece are held flat or in the same plane, so that when secured it projects on opposite sides of the wire, being simply shortened by the amount of the material taken up by the fold. In making the said fold only one of the walls of the contracting groove need be movable, and in the adaptation of the invention to the application of the sheet-metal piece to two parallel and separated wires both stationary walls are arranged adjacent to each other and between two outer and movable ones. The sheet-metal pieces as applied to two separated wires are called "tablets," and the completed structure is denominated "tablet-wire."

Figure 2:
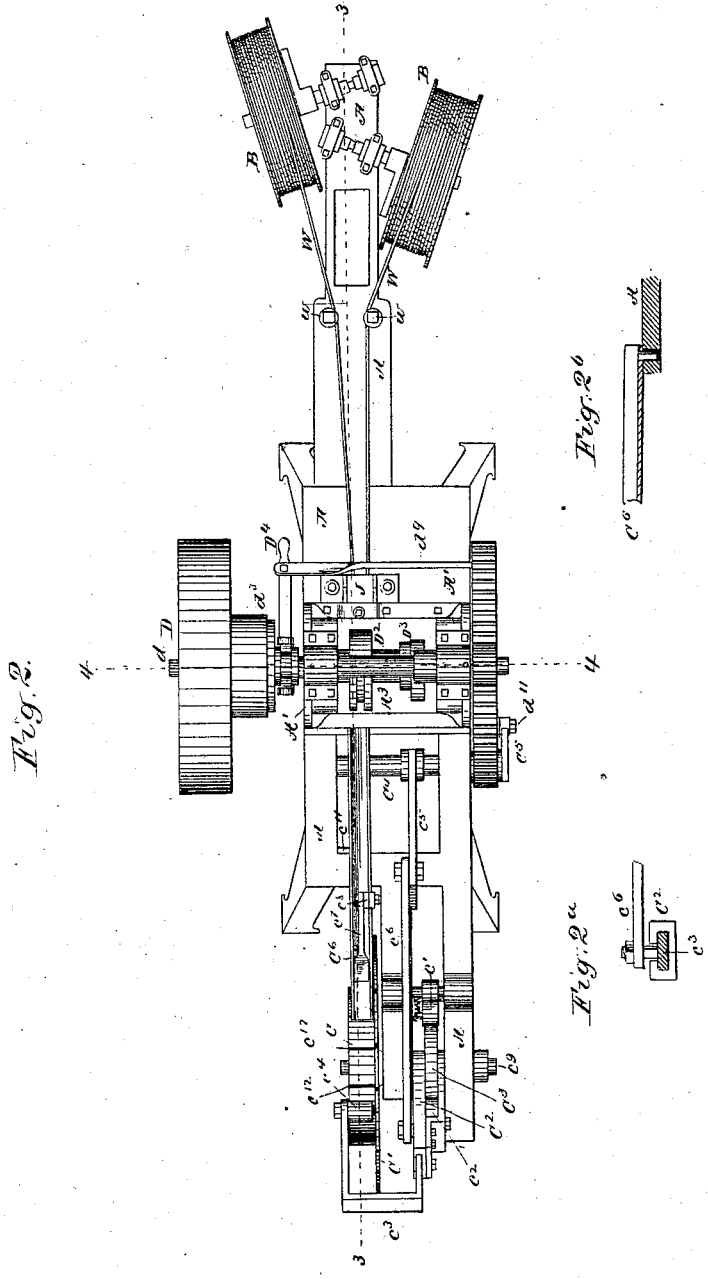
Figure 3:
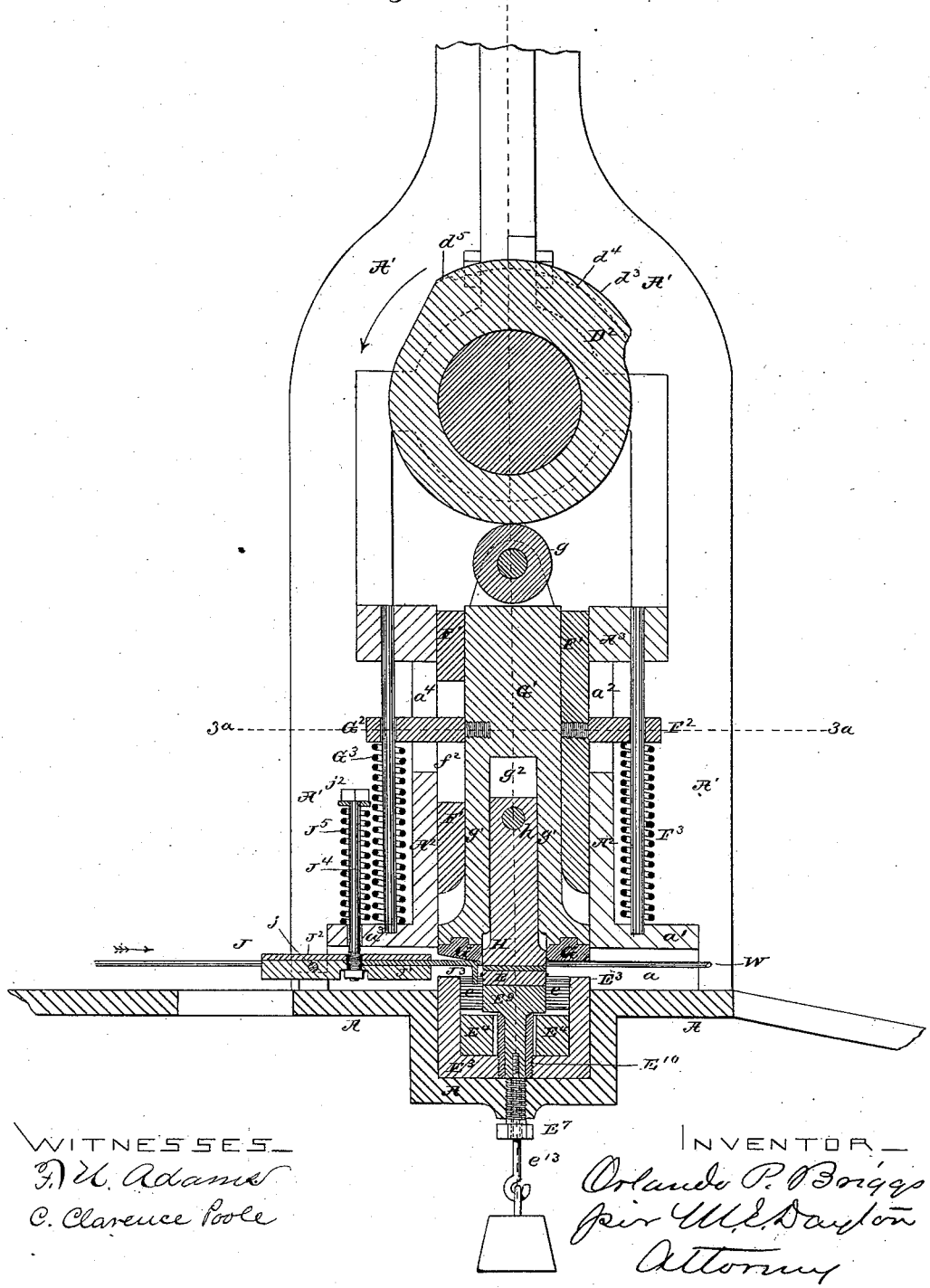
Figure 4:
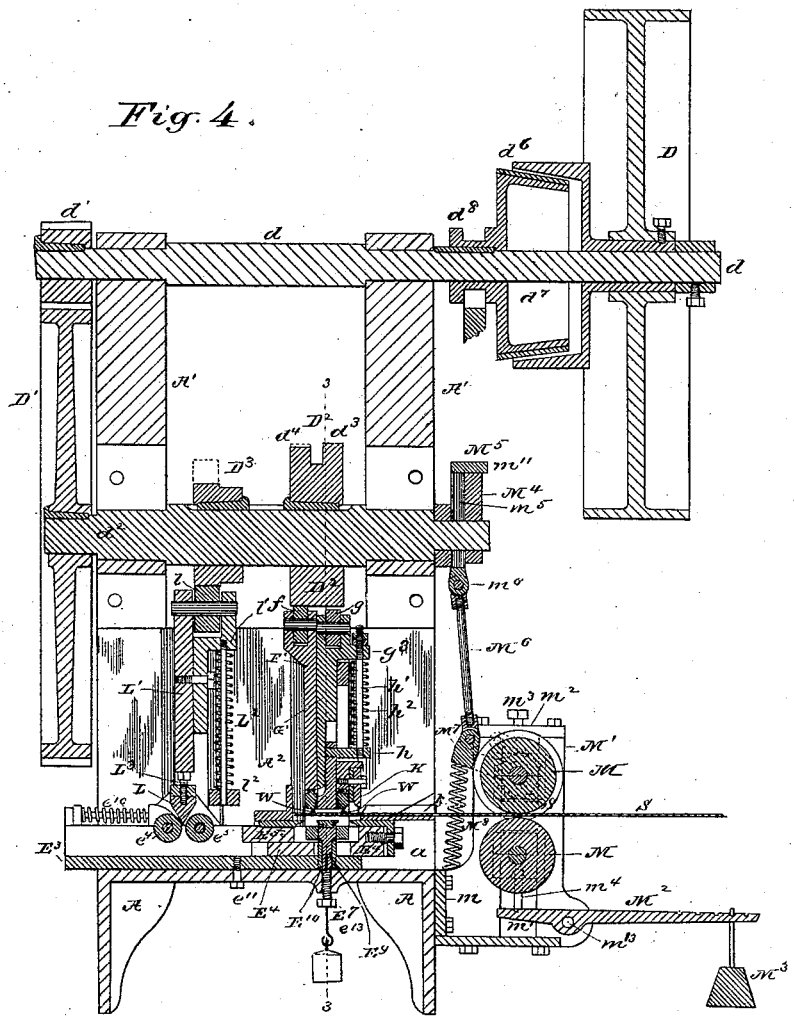
Figure 4A:
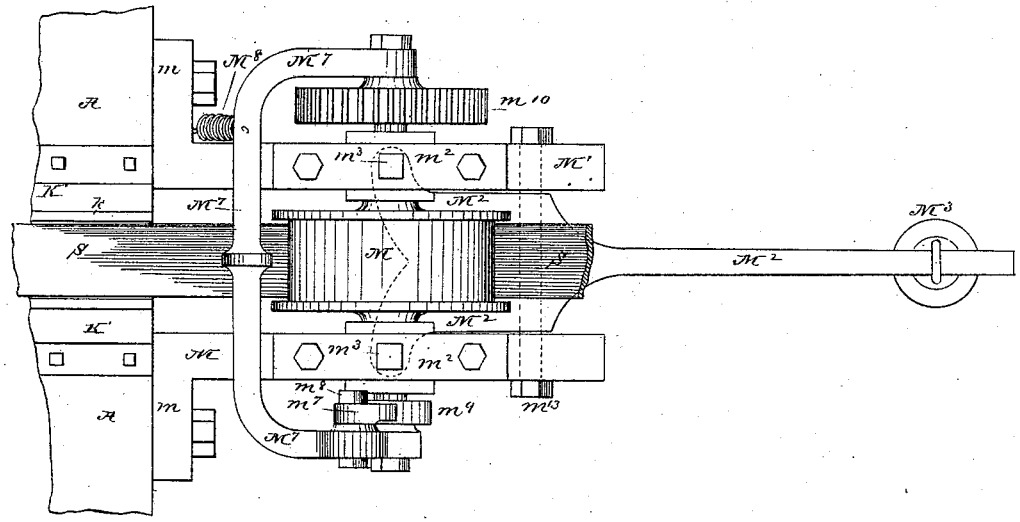
Figure 4B:
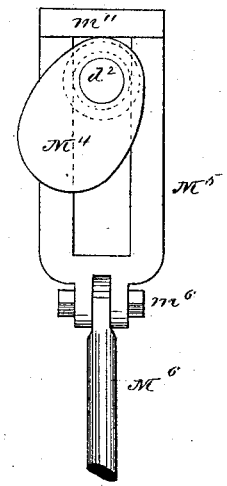
Figure 11:
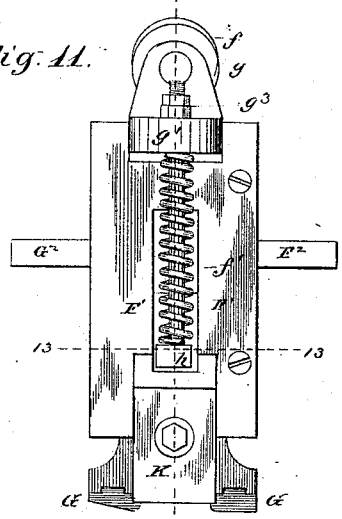
Figure 12:
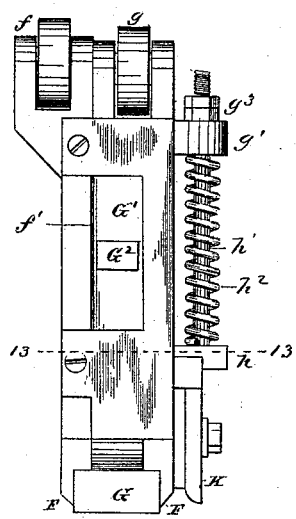
Figure 13:
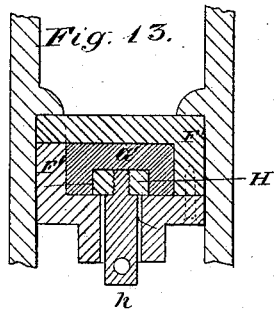
Figure 14:
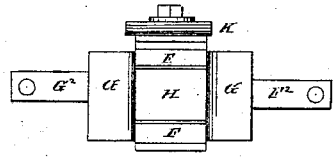
Figure 15:
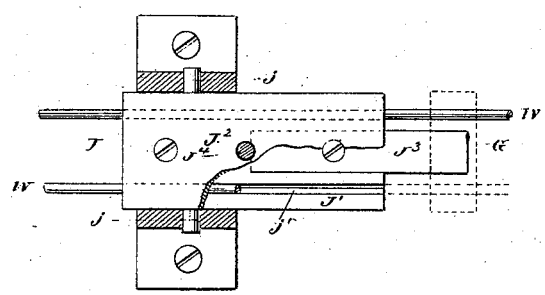

In the accompanying drawings, Figure 1 is a side elevation of a machine containing my invention for applying sheet-metal pieces to two parallel and separated wires. Fig. 2 is a plan view of the same, and Figs. 2ª and 2ᵇ are details. Fig. 3 is a vertical section of the central parts of the machine through the line 3 3 of Fig. 2. Fig. 3ª is a horizontal section of the upright parts of the machine through the line 3ª of Fig. 3. Fig. 4 is a transverse vertical section through the upright parts in the line 4 4 of Figs. 1 and 2. Fig. 4ª is a plan view of the strip-feeding mechanism. Fig. 4ᵇ is a detail in the feeding mechanism. Figs. 5 and 6 are enlarged sectional details, taken in the same plane as Fig. 4, illustrating certain operative parts in different positions and the fold in the sheet-metal piece in different stages of progress. Fig. 7 is a top view of the parallel wires and transverse sheet-metal pieces attached thereto as they leave the machine. Fig. 8 is a side elevation of the same. Fig. 8ª is a perspective view of one of the sheet-metal pieces in its final form or after being folded, but detached from the wires. Fig. 9 is a central vertical section of the movable folders and the box containing them, together with their immediate connections, taken in the same plane as Fig. 4 and enlarged. Fig. 10 is a plan view of the folders and the box containing them detached and enlarged. Fig. 11 is a side elevation of the plungers detached. Fig. 12 is a rear elevation of the parts shown in Fig. 11. Fig. 13 is a horizontal section of the parts shown in Fig. 11, taken in the plane 13 13 of Figs. 11 and 12. Fig. 14 is a bottom view of the connected parts shown in Figs. 11 and 12. Fig. 15 is a top view of the tilting guide plate or box by which the wires are directed to suitable position in the machine to receive the sheet-metal pieces. The remaining figures (16, 17, and 18) illustrate certain parts of the machine adapted to point and apply a barb to a single fence-wire.

A A is the bed and lower frame of the machine, and A' the central upright portion of the frame.

B B, Figs. 1 and 2, are two reels or spools mounted at one end of the machine, from which the plain wires W are supplied; and C, Fig. 2, is a drum or spool located at the opposite end of the machine, upon which the finished product is wound. The drum C is provided on one side with a broad flange, C', against which the tablet-wire is piled, said flange having a number of radial slots, $c$, continuous with transverse grooves or slits $C^{12}$ in the peripheral face of the drum, which permit binding-wires to be inserted and tied at different points around the roll or coil of finished wire before it is removed from the drum. As here shown, the wires W W are drawn forward intermittently through the machine by mechanism operating on the winding-drum C, and consisting of the following devices:

$C^3$ is a metal friction-pulley, keyed on the drum-shaft $c^9$. On the same shaft is pivoted a lever, $C^2$, carrying an eccentric friction pawl or clutch, $c^2$, which is borne into contact with the periphery of the pulley by a spring, $c^{10}$, so that when the arm $C^2$ is thrown outward or forward the clutch $c^2$ engages with the surface of the pulley $C^3$ and gives the drum a partial rotation. A similar detent pawl or clutch, $c'$, pivoted to an adjacent part of the frame, and also arranged to bear upon the periphery of the pulley $C^3$, prevents backward rotation of the drum-shaft. The lever $C^2$ is actuated at intervals of time by a pin, $d^{11}$, on an arm of the continuously-rotating spur-wheel D', which pin, at each rotation of the spur, strikes a lever, $C^5$, keyed to a transverse shaft, $C^4$, having an arm, $c^5$, connected by the rod $c^6$ with the lever $C^2$. In order that the movement of the drum C, thus actuated, may vary with the quantity of material accumulated thereon, so as to give equal intervals between the tablets upon the wires W, the connecting-rod $c^6$ is pivoted at its outer end to the inner face of a return-bent bar, $c^3$, which bears by a roller, $c^4$, at the end of one of its legs on the periphery of the increasing roll of finished wire upon the drum, and the other leg of which slides longitudinally in a longitudinal T-groove on the inner face of the lever $C^2$, as seen in Fig. 2ª. As the roll of tablet-wire increases in diameter, therefore, the distance of the connection of the rod $c^6$ with the lever $C^2$ from the axis $c^9$ of the latter, or, in other words, the working length of the lever $C^2$, also and proportionately increases, with the obvious effect of giving an equal forward feed of the wires W at each movement of the winding-drum C. The lever $C^2$ is retracted by the contractile coiled spring $C^7$, connected at one end with said lever, and at the other with one of the fixed uprights A', as shown only in Fig. 1.

$C^6$ is a guide-trough, having a horizontal bottom for directing the tablet-wire to the drum C, being pivotally connected at its inner end, as shown in Fig. 2ᵇ, in position to receive the wires, and at its outer end arranged to ride the drum C or the wire thereon. It is held against the drum-flange C' by an upright, $c^{11}$, fixed to the frame A. To the outside of the trough $C^6$ is fastened a standard, $c^8$, at the top of which is pivoted a bar, $c^7$, the free end of which is flattened horizontally, and which bears by its weight or otherwise on the tablet-wire in the trough near the free end of the latter, as more plainly shown in Fig. 2, for the purpose of holding the tablet-wire flat in the trough.

S represents the strip of sheet metal from which the tablets are cut in the machine preparatory to their being fastened to the wires W W. Said strip is intermittently fed into the machine transversely to the wires W and beneath them, either by hand or, preferably, by a suitable feeding device.

K', Figs. 4, 5, and 6, is a suitable stationary table, on which the strip S is conducted into the machine, and the inner end of said table is shown in said figures as the under knife for severing the strip, acting in opposition to the vertical reciprocating knife K. The table K' is provided with longitudinal flanges $k$, (one on each side,) for retaining the strip S thereon, and directing said strip accurately to the operative parts of the machine.

$E^3$ is a cast-iron box, say, about a foot long, an inch and a half or two inches wide, and an inch deep, arranged removably in a transverse open-ended recess, $a$, in the bed of the frame A, and in line with and below the strip feed-table K', as shown in Figs. 3, 4, 5, and 6. The box is shown detached and enlarged in Figs. 9 and 10. It contains parts concerned in folding and compressng the sheet-metal tablet S' about the wires, of which parts E is a laterally-stationary head affixed to the top of a post, $E^9$, which is supported by the cross-bars $e\ e$, fixed to the sides of the box E, and arranged one at each side of the post. Said head is intended to uphold the central portion of the tablet, and those of its edges which are transverse to the box form the overhanging inner walls of the two grooves or spaces, into which the sheet metal and the wires W are depressed.

E' and $E^2$ are movable folding-heads, arranged with their inner overhanging edges parallel with and in opposition to the folding edges referred to of the head E. The heads E' and $E^2$ have their upper flat surfaces in the same plane with the similar surface of the head E, and the tablet or sheet-metal piece S', when severed from the strip S, lies upon said heads and over the two parallel spaces between them. The heads E' and $E^2$ are adapted to be simultaneously moved inwardly toward the head E by the following devices:

$E^4$ is a slide, which lies on the bottom of the box $E^3$, and has the head $E^2$ secured to its elevated outer end. For a portion of its length, near the head $E^2$, the slide $E^4$ is of the full width and half the depth of the interior of the box $E^3$, and is longitudinally slotted, to give place to the post $E^9$. For the remainder of its length it occupies the full depth of the box and less than half its width at one side of said box, as best seen in Fig. 10. The head E' is fastened to the end of a second slide, $E^5$, which, beneath the head, also occupies the full width of the box above the slide $E^4$, and at its opposite end is shaped like the slide $E^4$, but is arranged to occupy the opposite side of the box.

From the inner surface of the vertically-broad portion of the slide $E^4$ projects the roller-pin $e^4$, and from the adjacent surface of the slide $E^5$, and nearer the folding heads, projects a similar roller-pin, $e^5$. These roller-pins stand squarely opposite each other, as shown in Figs. 9 and 10, and by forcing a vertically-guided wedge downward between them, it is evident that the slide $E^4$ will be longitudinally moved, so as to bring its head $E^2$ toward the head E, and that the slide $E^5$ will be longitudinally moved in the opposite direction, so as to carry its head E' also toward the head E. Such a wedge is shown at L, Fig. 4, being forced downward by a properly-guided reciprocating bar, L', actuated as will be hereinafter described. After the wedge is withdrawn the slides $E^4$ and $E^5$ are moved to retract the heads E' and $E^2$ by means of suitable springs, $e^{10}$, properly connected with the slides and adjacent stationary parts of the box. Thus, for the slide $E^4$ an expanding spring, $e^{10}$, is arranged between the projection $e^6$, fixed to the box $E^3$ and the projection or shoulder $e^3$ on the slide. For the slide $E^5$ a similarly-expanding spring, $e^{10}$, is arranged between the projection $e^7$ on the slide and the shoulder $e^8$ on the adjacent part of the box $E^3$. The box $E^3$ is secured in the seat or recess $a$ by means of a screw, $e^{11}$, which passes upward through the bed A into the bottom of the box, as illustrated in Fig. 4. Its position is regulated with reference to the position of the wires W, so that the latter in their passage through the machine and above the strip S are suspended over the spaces or grooves between the adjacent overhanging edges of the heads E, E', and $E^2$, as also indicated in Fig. 4.

For the purpose of severing the tablet from the strip S, the vertically-reciprocating knife K has already been mentioned. For the further purposes of producing the grooves or depressions in the tablet to receive the wires W of sinking the wires W into said depressions, of holding the tablet flat while the folders compress it about the wires, and of making a bend or crimp in each wire at the edges of the tablet, other vertically-reciprocating parts and actuating devices are provided as follows:

Referring more particularly to Figs. 3, $3^a$, 4, 5, 6, 11, 13, and 14, F F are two parallel connected steel plungers, called "tucking-plungers," having narrow faces arranged over the wires W and over the spaces between the folding heads E, E', and $E^2$, above described. They are secured to a stock composed of two angle-shaped upright parts, F' F', bolted together to form a box-like structure, more plainly understood by reference to Figs. 5 or 6 and 13 and 14. This stock has a vertical reciprocating movement between stationary guiding parts $A^2 A^3$ of the frame-upright, as seen in Figs. 3 and $3^a$, and is provided with a roller, $f$, at the top arranged to abut an actuating rotary cam, which is constructed to force the stock and plungers downward. An expanding coiled spring, $F^3$, resting on the horizontal flange $a'$, lifts the plunger-stock through the medium of an arm, $F^2$, screwed into the stock, and projecting through the opening $a^2$ in the guiding-plate $A^2$, as seen in Figs. 3 and $3^a$.

Within the hollow stock F' is located a stock, G', carrying the pressers or crimpers G G, arranged and extending transversely over both wires W, one at each side of the head E. This stock has an independent longitudinal reciprocating movement, and is forced downwardly by a rotary cam bearing on the roller $g$. Said stock is also raised by an expanding coiled spring, G³, resting on the flange $a^3$, and bearing upwardly against an arm, G², which screws into the stock and projects through an opening, $a^4$, in the adjacent guide-plate, A², and through a vertical slot, $f^2$, in the stock F'. The stock G' is deeply recessed from one side, at $g^2$, in its lower portion for, say, half its length or more, and at its lower end is bifurcated. The recess $g^2$ contains a third vertically and in part independently movable "holding-plunger," H, the lower face of which bears broadly upon the tablet over the central head, E. Said holding-plunger is provided with an arm, $h$, screwed into it and projecting through the vertical slot $f'$ of the stock F', and from this arm rises a rod, $h'$, which passes through a lug, $g'$, on the stock G', and is provided above said lug with adjusting-nuts $g^3$. The rod $h'$ thus suspends the plunger H, and the latter is thereby lifted in the upward movement of the stock. An expanding coiled spring, $h^2$, surrounding the rod $h'$ between the arm $h$ and lug $g'$, permits the stock H to come to rest upon the tablet before the plungers G have finished their descent, and holds it in this position until said plungers have made the first part of their ascent. The nuts $g^3$ are adjusted to allow the lower end of the plunger H to project below the other parts when all are lifted. The knife K is rigidly secured to the stock F', as seen in Figs. 5 and 6.

The operation of the several parts above described as being concerned in applying the tablet to the wires W W is as follows: The plungers F and G are or may be simultaneously started in their descent. The holding-plunger H will first strike the tablet-strip and bear it downward, while the knife K will follow and sever the tablet from the strip. The tablet being centrally held upon the head E by the plunger H, the "tucking-plungers" F bear the wires W downward against the tablet and force the latter into the grooves or spaces between the several folding heads E, E', and E² and against the cross-bars $e\ e$, the heads E' and E² being at this moment retracted. In the movement described the lower faces of the tuckers usually descend to the plane of the folders E, E', and E², or below said plane, if desired. The relative positions of the parts at this stage of the operation are shown in Fig. 5. The crimpers G G (see Fig. 3) continue their downward movement and bend the wires downwardly at the opposite edges of the tablet, being opposed by the stationary cross-bars $e\ e$. (If it is desired that the offset or bend of the wires shall exceed the thickness of the tablet, said cross-bars may be lowered on their upper surface, beneath the crimpers, as suggested by the transverse lines on said bars in Fig. 10.) Following or during this movement of the crimpers G the tuckers F rise, say, the thickness of the sheet metal, or until their lower faces are on a level with the upper surface of the tablet, and the folders E' and E² advance toward the stationary folder E. The folders operate to close the grooves or depressions made in the tablet about the wires W, which latter are meantime held in said depressions by the crimpers, while the tablet is held down at its ends and middle by the now stationary holder H and tuckers F, the latter while in their present position operating as holders to keep the ends of the tablet down upon the subjacent folders. Finally, all the pressure-giving parts are retracted and the wires drawn forward for the application of another tablet. In this operation the tablet must obviously be drawn endwise off the central head, E, since the latter is, so to speak, dovetailed into the former. To favor this movement, the head is made slightly narrower on the end toward the coiling-drum, and it is also adapted to be lifted into the tension-line by having its post E⁹ squared and fitted to freely rise in a corresponding fixed sleeve, E¹⁰. After the tablet has been drawn off the folding head E, the latter is drawn down again to its seat by a weight suspended from a wire, $e^{13}$, threaded into the lower end of the post E⁹. Said post, as here shown, rests on an adjusting-screw, E⁷, Fig. 3, threaded through the bed-plate A and having a central longitudinal aperture for the free passage of the suspending rod $e^{13}$. The wires W W are raised after the application of a tablet and are supported while the strip S is again fed forward beneath them by means of a tilting guide-plate, J. (Seen in its relation to other parts in Figs. 2 and 3, and detached and in broken plan view in Fig. 15.) Said tilting guide and lifter consist of a plate, J', pivoted at $j$ in suitable angle-plates upon the bed, having grooves $j'$ for the passage of the wires W and covered by a second plate, J².

Set into the upper surface of the lower plate, J', is the central metal piece, J³, which extends forward beneath the adjacent crimper G, so that when the crimper descends it strikes the piece J³ and tilts the guide-plate. A rod, J⁴, loosely set in the guide-plate between its axis $j$ and its inner end, and provided with an expanding spring, J⁵, and nut $j^2$ above the fixed flange $a^3$, serves to lift the guide and the wires when the adjacent crimper G is raised. The tilting movement of the guide-plate has the further object of at once acting near the point at which the tablet is to be secured, and avoiding the production of another bend in the wires W than that made at the edge of the tablet. For this last purpose also the under face of the adjacent crimper G is beveled upwardly toward the guide.

The movements of the various plungers having been described, it is of course but a merely mechanical matter to provide cams acting upon the rollers $f$ and $g$ to produce said movements, or any variation thereof that may be required. In the present instance such cams are provided in the single cam-wheel $D^2$, keyed to the rotating shaft $d^2$, and provided with the two peripheral cam-faces $d^3$ and $d^4$, elevated above the general circular and concentric surface of the cam. The face $d^3$, which thrusts the plungers G, is a uniform concentric elevation of suitable length, as shown in full lines in Fig. 3. As here shown, the prominence $d^4$, which operates the tuckers F, is slightly less high at its advanced end than $d^3$, and is still lower for the remainder of its extent, as indicated by dotted lines of said Fig. 3. Both working prominences begin and terminate at the same points on the wheel $D^2$. The initial elevation $d^5$ of the cam-face $d^4$ is that by which the tuckers are made to force the wires, together with the sheet-metal tablet, into the spaces between the folding heads, and the remainder of said face, being concentric with the shaft $d^2$, holds said tuckers in their partially-raised position in which they act as holders or guides for the ends of the tablet while the latter is being folded or clamped upon the wires W, as above described. The shaft $d^2$ also carries a cam, $D^3$, which actuates the wedge L through the medium of a vertically-reciprocating stock, L', having a roller, $l$, Fig. 4, said stock being guided by flanges $l^3$ on the stationary upright parts $A^2$, and raised by a coiled expanding spring, $L^2$, interposed between the projection $l'$ on the upper end of the stock and the lug $l^2$, projecting from the upright part $A^2$ of the frame. The cams are of course properly timed to actuate the several plungers and wedge in the desired order of time. The wedge L is not necessarily attached to the stock L', but (as here shown) may be independently guided by projections fitted in vertical grooves $e^2$ in the elevated parts $e'$ of the folder-box $E^3$. (Clearly seen in Figs. 9 and 10.) In this case the wedge is sufficiently abrupt to be raised by the contractile force of the springs $e^{10}$, operating to retract the folders E' and $E^2$. In this construction of the wedge the time and length of its throw may be varied by an adjustable bolt, $L^3$, threaded into the top of the wedge in position to be struck by the stock or follower L', as seen in Fig. 4.

The driving devices of the machine consist of a drive-shaft, $d$, mounted in proper bearings on the top of the uprights A', and provided with a drive-pulley, D, at one end and a pinion, $d'$, at the other, which pinion meshes with the spur D', keyed on the shaft $d^2$.

For the purpose of enabling the operator to arrest and start the machine quickly, the pulley D is loosely mounted on the shaft $d$, and is provided with the flange $d^6$, having an inner tapered friction-face concentric with the sliding tapered friction-pulley $d^7$, feathered on the shaft $d$. Said pulley has an annularly-grooved hub, $d^8$, with which is engaged the forked end of a hand-lever, $D^4$, fulcrumed between its ends and arranged in convenient position to be reached by the attendant, as seen in Fig. 2. A bar or rod connects the hand-lever $D^4$ with a foot-lever, $D^5$, fulcrumed at $d^{10}$, by which the operator, when seated at the machine on that side at which the strip S is fed, may throw the friction-gear out of engagement and arrest the machine. When the strip S is fed by hand, a stop, $E^6$, Figs. 4, 5, 6, and 9, is provided, against which the end of the strip is thrust as soon as the plungers are raised to allow its advance.

The folding-head $E^2$ is shown as being adjustably secured to its slide $E^4$ by means of a threaded bolt, $E^8$. (Seen plainly in Fig. 9.) The head E' may also be adjustably fastened to the slide $E^5$ by familiar means of attachment, not necessary to be shown or particularly described.

An intermittent feeding mechanism for carrying in the tablet or barb strip is shown in central vertical section in Fig. 4 and in plan view in Fig. $4^a$. In this mechanism M M are two horizontal cylindric feed-rollers, mounted one above the other in vertically-adjustable bearings in the parallel frame-pieces M' M', bolted by flanges $m$ to the side of the main frame A. The upper roller is shown as being provided with annular flanges at its ends, which retain the strip, and which may also preferably set down over the ends of the lower roller. Stop-bolts $m^3$, passing through the cap-plates $m^2$ and bearing on the journal-boxes of the upper roller, determine the height of the latter, and the lower roller is borne upward to suitably clamp the strip S, embraced between the rollers, by means of a weighted lever, $M^2$, pivoted at $m^{13}$, and having its end laterally extended into the slideways $m'$, as indicated by dotted lines in Fig. $4^a$. If required, vertical pins $m^4$ may be interposed between the lever and boxes. The shafts of the rollers are provided with intermeshing pinions $m^{10}$, and the upper roller-shaft is also provided with a ratchet-wheel, $m^9$.

$M^7$ is a pawl-lever pivoted on the axis of the upper shaft, and provided with the pawl $m^7$, pivoted thereto by the pin $m^8$. As here arranged, an upward movement of the pawl-lever carries the proximate surfaces of the feed-rollers inward as required to feed the strip S to the machine. This reciprocation of the pawl-lever is produced by means of a cam, $M^4$, keyed to the rotating shaft $d^2$, in conjunction with a slide, $M^5$, and connecting-rod $M^6$. Said slide, as here shown, is guided by being slotted to embrace the shaft $d^2$ between the cam and a broad-faced inner disk or shoulder, and is held vertical by its connection with the rod $M^6$; but it may advantageously be otherwise or additionally guided.

For the purpose of providing for a straight and direct-acting connecting-rod, $M^6$, without the interposition of other devices, the pawl-lever $M^7$ is made in yoke form, and is pivoted at both ends of the upper roller-shaft, as seen in Fig. 4ª, thus allowing the said rod to connect therewith at its middle point and to stand vertical beneath the shaft $d^2$. If desired, a spring, $M^3$, may be employed to draw the pawl-lever downward to retract the pawl, as indicated in Figs. 4 and 4ª.

In Figs. 16 and 17 the parts of the machine concerned in cutting the piece of sheet-metal from the strip and folding it upon the wire are shown in their adaptation to making and applying a sheet-metal barb to a single fence-wire.

Fig. 16 is a plan view of the box $E^3$ and its contained parts, together with the lower end of the knife in horizontal section in the plane of the upper surface of the severed barb S'; and Fig. 17 is a vertical section of said box and its contained and adjacent parts through the line 17 17 of Fig. 16.

Fig. 18 shows the completed barb attached to the fence-wire. But one stationary and one movable folder are here shown, the former E being constructed and arranged to also act as the lower cutter. To this end it is beveled at the cutting end to give the required point to the barb. When the folder E is constructed to serve as a cutter, provision is made for its wear at the cutting end by giving said head suitable length and longitudinal movement in a lateral extension, $E^{11}$, of the box $E^3$ by means of a set-screw, $E^{12}$. The slide $E^5$, of the single opposing-head E' is flat and fills the box $E^3$ throughout its length, being slotted at $e^{15}$, to give room for the roller $e^5$, wedge L, and fixed post $e^{16}$, against which abuts the spring $e^{10}$, for retracting the slide. The knife K corresponds in the obliquity of its edge with that of the cutter-folder E, and the strip S, instead of the tablet, is lowered by the action of the knife. To permit this and to insure the raising of the end of the strip S into position to be again fed forward, a table, $K^2$, is provided beneath the knife, which is depressed as the knife descends and rides and lifts the strip when the knife recedes, so that the strip can again advance. The holder H has a triangular face on its lower end, which bears upon the barb and folder E, and may be secured to a stock corresponding with G' of other figures by the yielding spring-connection already described. The knife may also be attached to the stock of the tucking-plunger F, and be carried thereby, as already set forth. The vertically-movable table $K^2$ has a central post, $k'$, projecting from its under face and passing loosely through the bottom of the box $E^3$, where it is provided with a threaded adjusting-nut, $k^2$. A coiled expanding spring interposed between the box-bottom and the table about the post $k'$, as shown in Fig. 17, serves to raise the table when the knife K is retracted.

In Fig. 17 a second wire, W', is shown, passing through apertures $w'$ in the opposite sides of the box $E^3$, and beneath the barb and the wire W. This represents a plain unbarbed wire, which may be twisted with the barbed wire W as they both emerge from the barb-applying devices by means of any of the approved mechanisms now in use for this purpose.

It is manifest that the strip S may be bent at the desired points to drop between the supporting folding heads, so as to form the open grooves shown in Fig. 5, before said strip is fed to the machine, and the wires subsequently borne down into said grooves preparatory to closing the latter by the folders. In other words, it is not essential to the broad invention that the wires W shall be concerned in bending the strip, barb, or tablet. In this case the crimpers G may carry the wires down and the tuckers be depressed only far enough to act as holders, or to their second position, as above described.

It is also manifest that in applying a narrow piece of sheet metal, such as is shown in Fig. 16, and as is suited for a barb, the parts called "crimpers" G, or one of them, may also be used to press or bear the wire downward, and thereby make the desired bend in the barb, in which case also the parts F, called "tuckers" need be depressed only to serve as holders or shapers for giving the desired direction to the ends of the barb, either by preventing them from tilting up when the fold is made or by bending them down after being thus tilted up. Any variation in the movements of these parts will be effected by appropriate modifications of the cam-faces, by which they are actuated.

The machine having two sets of folders precisely as shown in Figs. 5 and 9, may be used for applying a barb to a single wire, if desired, simply by arranging the knives to sever the strip S obliquely and feeding the wire W over the space between the folders E and $E^2$. The modifications shown in Figs. 16 and 17 are therefore not essential, and are desirable only in a machine not adapted to fasten the sheet metal to two separated wires.

Obviously, the machine described is adapted to operate upon round wires in place of the sheet-metal pieces S' spoken of and shown; and I desire that it shall be understood that the invention is not limited to use upon sheet-metal tablets or barbs.

The tablets may be serrated, as indicated by dotted lines in Fig. 7, or they may be otherwise sharpened at their ends to form barbs; and, inasmuch as the machine is adapted, as stated, to the manufacture of single barbed-wire as well as double-tableted wire, the words "barb" and "tablet" are for convenience used synonymously or interchangeably in the following claims.

Some of the matters shown in Figs. 16 and 17 and features of construction in the feeding devices for the fence-wire and the barb or tablet strip will form the subjects of separate application for patent.

I claim as my invention—

1. In a machine for attaching barbs or tablets to fence-wire by substantially the form of fold described, means for feeding the fence-wire through the machine, means for directing the barb into position transverse to the fence-wire, means for folding the barb upon the wire, and means for holding the ends of the barb outward, substantially as described.

2. In a machine for attaching barbs or tablets to a wire by the form of fold described, means for feeding the wire through the machine, two folders, one relatively movable to the other, means for forcing the wire and barbs into the space between the folders, means for forcing the folders toward each other while the wire and barb are in this position, and means for holding the ends of the barb outward, substantially as described, for the purposes set forth.

3. In a machine for attaching barbs or tablets to a wire by the form of fold described, means for feeding the wire through the machine, means for guiding a strip from which the barbs are to be cut transversely to the wire, means for severing the barb from the strip, two folders, one relatively movable to the other, means for forcing the wire and strip into the space between the folders and holding the ends of the barb outward, and means for compressing the folders upon the parts embraced thereby, substantially as described, and for the purposes set forth.

4. In a machine for attaching a barb or tablet to a wire by the form of fold described, the combination, with two folders, one relatively movable to the other, for clamping the barb about the wire, of a reciprocating presser, G, arranged to bear upon the wire at the side of the barb, substantially as described.

5. In a machine for attaching a metal piece between its ends transversely to a wire by the form of fold described, devices for folding the piece about the wire consisting of a stationary folder and an opposing movable folder, one or both said folders having its bearing-face inclined downwardly and outwardly, whereby when the wire and barb are compressed between them the barb fold is made to embrace the wire for more than one-half its circumference, and means for holding the ends of the barb outward, substantially as described.

6. In a machine for attaching a barb or tablet to a wire by the form of fold described, the combination, with the stationary and movable folders, of a device for forcing the wire and barb into the space between the folders, and a presser arranged to simultaneously bear the barb against the stationary folder, substantially as described.

7. In a machine for attaching a barb or tablet to a wire by the form of fold described, the combination of folders, means for depressing the barb and wire between the folders, and means for holding the ends of the barb outward, substantially as described.

8. In a machine for attaching barbs or tablets to fence-wire by the form of fold described, the combination of means for feeding the fence-wire, means for feeding the barb-strip, means for severing the barb from the strip, means for forcing the fence-wire against the barb, means for folding the barb about the fence-wire, and means for holding the ends of the barb, substantially as described.

9. In a machine for applying barbs or tablets to a wire by the form of fold described, the combination of means for feeding the fence-wire, means for feeding the barb-strip, means for severing the barb from the strip, means for depressing the fence-wire and barb, means for folding the barb about the fence-wire, and means for raising the wire and barb after the latter has been folded, substantially as described.

10. In a machine for applying barbs or tablets to a wire by the form of fold described, the combination of means for feeding the fence-wire, means for directing the barb-strip beneath the fence-wire transversely thereto, means for severing the barb from the strip, a stationary and a movable folder, means for depressing the fence-wire and barb between the folders, means for actuating the movable folder, and means for holding the ends of the barb outward, substantially as described.

11. In a machine for applying barbs or tablets to a wire by a central fold in the barb partly or wholly embracing the wire, the combination of means for feeding the fence-wire, means for directing the barb-strip across the fence-wire, means for severing the barb from the strip, two folders, one relatively movable to the other, means for carrying the wire and central part of the barb into the space between the folders, means for actuating the folders, and means for holding the ends of the barb outward, substantially as described.

12. In a machine for the purpose set forth, the combination, with an opposing folder-head, of a movable folder-head attached to a slide, a reciprocating wedge arranged to bear by its inclined face upon the slide for the purpose of proximating the heads, and a spring arranged to retract the slide, substantially as described.

13. In a machine for attaching a metal piece simultaneously to two separated wires by the form of fold described, the combination, with appropriate mechanisms for supporting the parts to be joined in position, as set forth, of a central laterally stationary folding-head, E, and two adjacent movable folder-heads, E' and E², and means for actuating the latter at suitable intervals of time, substantially as described.

14. In the folding devices of a machine for the purpose set forth, the combination, with the laterally stationary folding-head E, of the slides E⁴ and E⁵, carrying folder-heads E² and E', respectively, arranged, as shown, with respect to the head E, the oppositely-arranged pins $c^4 e^5$, attached to the slides, a reciprocating wedge arranged to enter between the pins, and means for retracting the slides as the wedge is withdrawn, substantially as described.

15. In a machine for attaching metal pieces to a wire by the form of fold described, the combination, with a stationary folder and a movable folder, of a presser arranged opposite the stationary folder, a tucker arranged opposite the space between the folders, and actuating mechanisms for the presser and tucker, whereby the presser is caused to press the metal piece during the act of folding, and the tucker is first depressed to carry the parts to be joined into the space between the folders, and is then partially raised to allow the movable folder and metal piece to pass closely beneath it in the act of folding, and both are finally lifted to freely admit another metal piece, substantially as described.

16. In the machine described, the combination of a central stationary folder, E, and laterally-arranged movable folders E' and E$^2$, means for guiding the wires W to position over the spaces between the folders, means for directing and severing the strip S', tucking-plungers F, arranged in position to carry the wires between the folders, and crimping-plungers G, arranged at the opposite sides of the folders, together with actuating mechanism for reciprocating the plungers and movable folders, substantially as and for the purposes set forth.

17. In combination with the folders and with parts for depressing the wire and piece S' into the space between the folders, means for lifting the wire after the piece S' has been attached thereto, so as to admit the strip S beneath it, substantially as described.

18. In combination with parts concerned in making the fold, a vertically-movable guide for the wire, and means for lifting the guide, substantially as described, and for the purposes set forth.

19. In combination with the parts concerned in making the fold, the tilting guide-plate J and its lifting-spring J$^2$, substantially as described, and for the purposes set forth.

20. In a machine for the purpose stated, the combination, with the folders, and with the part G, for depressing the wire, of the tilting wire-guide J, provided with a lifting-spring, and a projection, J$^3$, arranged to be struck and depressed by the part G, substantially as described, and for the purposes set forth.

21. In a machine for the purpose stated, the combination, with the two movable folders E' and E$^2$, and with means for lifting the wires W after the part S' has been attached to the wires, of a vertically-movable central folder, E, substantially as described, and for the purpose set forth.

22. In a machine for the purpose stated, the combination, with the two movable folders E' and E$^2$, of one intermediate folder, E, having its lateral edges converging in the direction in which the wire is fed forward, substantially as described, and for the purpose specified.

23. In the machine described, the plunger-stocks F' and G', constructed and arranged substantially as set forth, in combination with the double cam D$^2$ and lifting-springs F$^2$ and G$^2$, substantially as described.

24. In a machine for the purpose stated, the combination, with the folders and with the vertically-reciprocating stock G', of the presser H, rod h', and spring h$^2$, substantially as described, and for the purpose set forth.

25. In a machine for the purpose stated, the combination, with the frame and with the parts concerned in attaching the metal piece S' to the wire W, of the removable box E$^3$, carrying the folders and their slides, and means for securing it in the desired position, substantially as described.

26. The combination, with the vertically-movable folder-head E, of an adjusting-screw, E$^7$, arranged beneath said folder, substantially as described.

27. The combination, with the removable box E$^3$, carrying the vertically-movable folder E, of a removable hook, e$^{13}$, extending through the frame for the support of a weight by which to lower said folder after being released from the tablet, substantially as described.

28. In combination with the trough C, the pivoted bar c, arranged with its free end in the trough, substantially as described, and for the purposes set forth.

29. In a machine for attaching barbs to wire by the form of fold described, the combination, with the knives for severing the barb, of a presser located over the body of the severed barb and moving with the moving knife, and devices for holding the ends of the barb outward, substantially as described.

30. In a machine for attaching barbs to wire by the form of fold described, the combination, with the knives for severing the barb, of a tucker located over and constructed to force the fence-wire into the barb, supports for the fence-wire, and devices for holding the ends of the barb outward, substantially as described.

31. In a machine for attaching a barb or tablet to a wire by the form described, the combination of a partial form-giving device acting to force the fence-wire into the barb, a folder for completing the bend, and devices for holding the end of the barb outward, substantially as described.

In testimony that I claim the foregoing as my invention I affix my signature in presence of two witnesses.

ORLANDO P. BRIGGS.

Witnesses:
M. E. DAYTON,
JESSE COX, Jr.

Correction in Letters Patent No. 301,955.

It is hereby certified that in Letters Patent No. 301,955, granted July 15, 1884, upon the application of Orlando P. Briggs, of Chicago, Illinois, for an improvement in "Machines for Applying Metal Pieces to a Wire or to Wires," the name of the assignee was inadvertently written and printed "The Thorn Wire Hedge Company, of same place;" whereas said Letters Patent should have issued to *The Washburn & Moen Manufacturing Company, of Worcester, Massachusetts, and Isaac L. Elwood, of De Kalb, Illinois*, as assignees of said invention; and that the proper corrections have been made in the files and records pertaining to the case in the Patent Office, and should be read in the Letters Patent to make it conform thereto.

Signed, countersigned, and sealed this 5th day of August, A. D. 1884.

[SEAL.]

M. L. JOSLYN,
*Acting Secretary of the Interior.*

Countersigned:
BENJ. BUTTERWORTH,
*Commissioner of Patents.*